(12) United States Patent
Lotz

(10) Patent No.: US 6,533,240 B1
(45) Date of Patent: Mar. 18, 2003

(54) ELECTROMAGNETIC DRIVE UNIT FOR VALVE SLIDES OF SOLENOID VALVES

(75) Inventor: Ulrich Lotz, Neunkirchen-Struthütten (DE)

(73) Assignee: Thomas Magnete GmbH, Herdorf (DE)

( * ) Notice: Subject to any disclaimer, the term of this patent is extended or adjusted under 35 U.S.C. 154(b) by 166 days.

(21) Appl. No.: 09/709,120

(22) Filed: Nov. 8, 2000

(30) Foreign Application Priority Data

Nov. 10, 1999 (DE) ......................... 199 54 024

(51) Int. Cl.$^7$ ............................................. F16K 31/02
(52) U.S. Cl. ............................. 251/129.15; 251/129.01
(58) Field of Search ....................... 251/129.15, 129.02, 251/129.21, 129.01

(56) References Cited

U.S. PATENT DOCUMENTS 4,917,150 A * 4/1990 Koch et al. ............. 251/129.21
5,544,857 A * 8/1996 Torrence ................ 251/129.15
5,806,884 A * 9/1998 Johnson et al. ............. 280/736
6,213,445 B1 * 4/2001 Sato et al. ............. 251/129.15
6,412,814 B1 * 7/2002 Huber et al. ................ 280/736

* cited by examiner

Primary Examiner—Henry C. Yuen
Assistant Examiner—John Bastianelli
(74) Attorney, Agent, or Firm—Friedrich Kueffner

(57) ABSTRACT

An electromagnetic drive unit, particularly for valve slides of solenoid valves, includes a magnetically conductive housing which is connectable to a gas generator for airbags and a coil body provided with an exciting coil mounted in the housing, and a displaceable armature pretensioned by a spring and connected to the valve slide. The coil body with the exciting coil is closed off toward the open side of the housing by a correspondingly shaped metal cover. The cover is provided with a central hollow cylinderical portion which is surrounded with play by a cup-shaped member. The cup-shaped member guides the valve slide which is supported by the armature.

7 Claims, 1 Drawing Sheet

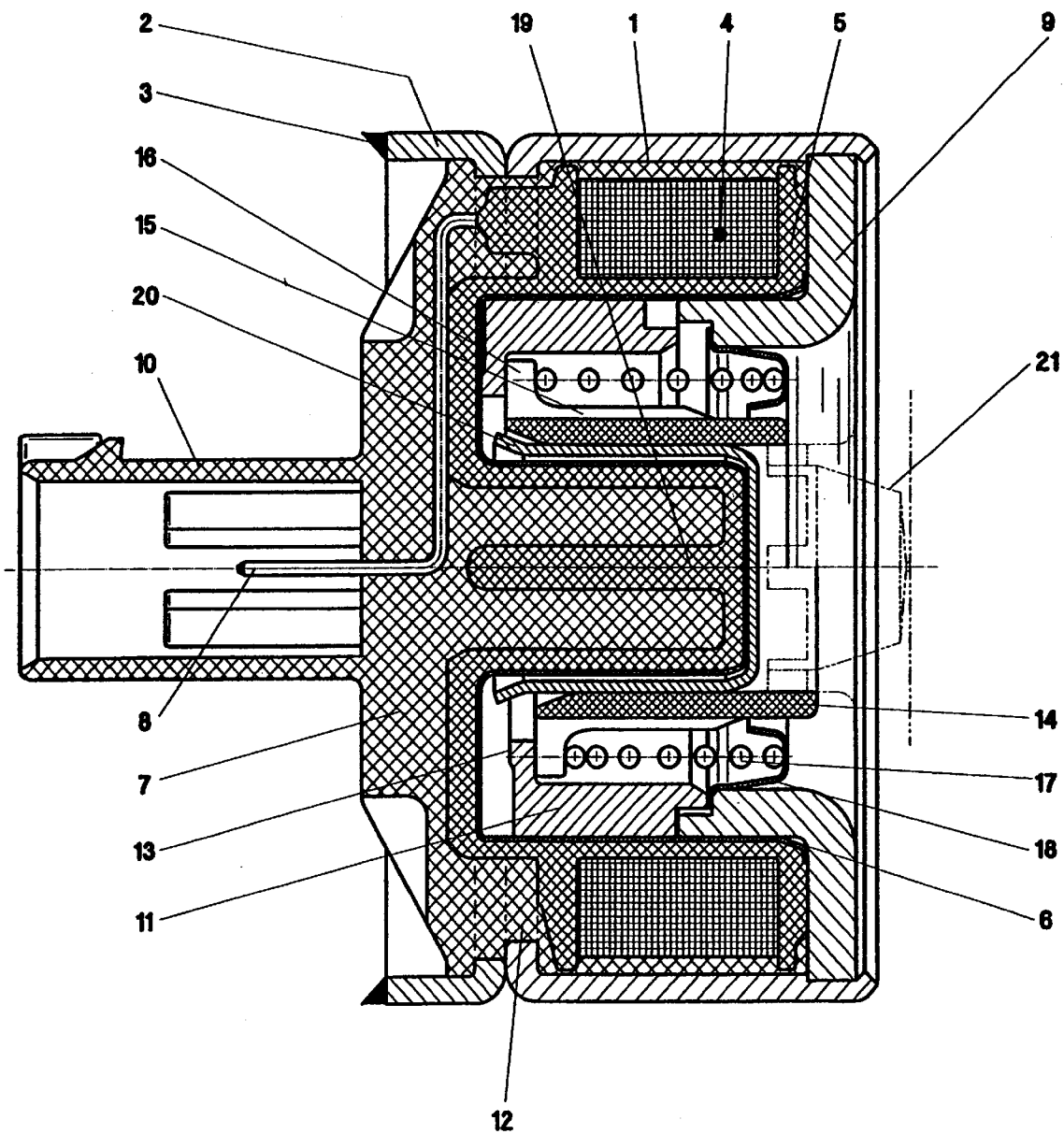

ELECTROMAGNETIC DRIVE UNIT FOR VALVE SLIDES OF SOLENOID VALVES

BACKGROUND OF THE INVENTION

1. Field of the Invention

The present invention relates to an electromagnetic drive unit, particularly for valve slides of solenoid valves, including a magnetically conductive housing which is connectable to a gas generator for airbags and a coil body provided with an exciting coil arranged in the housing, and a displaceable armature which is pretensioned by a spring and connected to the valve slide.

2. Description of the Related Art

Electromagnetic drive units of the above-described type are in wide use. Frequently, the valve is mounted in a common housing with the gas generator for airbags. However, in some cases it is desirable that the valve and the gas generator are mounted separately and that a compensating coupling of the drive with the gas generator is provided, particularly a compensation of the offset between the solenoid valve and the gas generator, wherein this compensation has in the past not been provided sufficiently and reliably.

SUMMARY OF THE INVENTION

Therefore, it is the primary object of the present invention to provide an electromagnetic drive unit for valve slides of solenoid valves for gas generators for airbags which meets the above-described special requirements, while being extremely reliable and being capable of maintaining high adjustment speeds.

In accordance with the present invention, the coil body provided with the exciting coil is closed off toward the open side of the housing by an appropriately shaped metal cover, wherein the cover is provided with a central hollow cylindrical portion which is surrounded with play by a cup-shaped member, and wherein the cup-shaped member guides the valve slide which is supported by the armature.

The features according to the present invention make it possible that the essential components of the drive can be easily mounted and securely covered, and then provide the possibility of an automatic compensation of any occurring radial deviations of the drive relative to the configuration of the connecting components of the gas generator.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a sectional view of the drive unit according to the present invention.

DESCRIPTION OF THE PREFERRED EMBODIMENTS

The drawing shows a deep-drawn housing 1 composed of a magnetically conductive material. A connecting ring 2 is mounted adjacent the housing 1. The housing 1 can be slid into a receptacle of a gas generator, not shown. The connecting ring 2 and, thus, the housing 1 can be connected to the gas generator by means of a welding seam 3. Provided in the housing 1 is a coil body 5 equipped with an exciting winding 4 and the housing 1 is covered toward the opening thereof by a deep-drawn metal cover 6. On its side facing the connecting ring 2, the housing 1 is provided with injected synthetic material 7 which secures the connecting ring 2, the metal cover 6, the contact 8 and the magnet yoke 9 and forms the plug-in socket 10. This injected synthetic material sealingly closes off the electromagnetic drive unit toward the side of the connecting ring 2, as does the metal cover 6 toward the opposite side.

When the exciting winding 4 is excited, a magnetic field is formed around the exciting winding 4 in the circuit formed by the wall of the housing 1, the magnet yoke 9 and, after interruption by the air gap, the armature 11 back to the housing 1. The housing 1 extends at its inner end through openings of the coil body 5 and is only interrupted by radial slots 12 which receive webs of the coil body 5 and permit the synthetic material 7 to pass through when it is injected. The webs defining the slots end in front of the hollow cylindrical wall of the metal cover 6 which guides the armature 11. The armature 11 has at its lower end an inner flange 13 which makes it possible for the armature to actuate a valve slide 14. This valve slide 14 is constructed essentially tubular and has at its outer wall ribs 15 with outwardly projecting end portions 16. The end portions 16 of these webs 15 rest on the inner flange 13 of the armature 11 and are pretensioned relative to the armature 11 by means of a compression spring 17 which rests against a spring plate 18 whose outwardly bent edge engages over pole surfaces of the magnet yoke 9 and is mechanically supported by the magnet yoke 9, on the one hand, and serves as an anti-adhesive sheet metal.

In accordance with an important feature, the valve slide 14 is guided on the outer surface of a cup-shaped member 20 which engages over a central projection 19 of the arrangement and rests with its bottom on the arrangement, wherein the cup-shaped member 20 has a greater diameter than the center projection 19 including the area of the metal cover 6 which engages over the center projection 19. Consequently, the valve slide 14 automatically follows the axial movements of the armature 11 against the force of the compression spring 17, and the valve slide 14 is guided cleanly in radial direction on the cup-shaped member 20, and wherein, however, the valve slide 14 is capable of adapting to the central projection 19 as well as to the cantilevering end portions of the ribs on the inner flange 13 of the armature 11. In the illustrated embodiment, the valve sleeve 21 is inserted into the opening of the valve slide 14; the valve slide 14 must be easily axially slidable with a small amount of play.

The electromagnetic adjusting or drive unit according to the present invention is always protected against external influences, can be easily assembled and is capable of compensation in the radial direction. Problems with the magnetic flux can be avoided if the metal cover 6, the spring plate 18 and the cup-shaped member 20 are made of thin, non-magnetic sheet metal, for example, a high-grade steel alloy, such as X 5 CrNi 1820 having a thickness of 0.8 mm.

While specific embodiments of the invention have been shown and described in detail to illustrate the inventive principles, it will be understood that the invention may be embodied otherwise without departing from such principles.

I claim:

1. An electromagnetic drive unit, for valve slides of solenoid valves, the drive unit comprising a magnetically conductive housing adapted to be connected to a gas generator for airbags, a coil body with an exciting coil mounted in the housing, and a displaceable armature pretensioned by a spring and connected to the valve slide, wherein the coil body with the exciting coil is closed off toward an open side of housing by a correspondingly shaped metal cover, wherein the cover comprises a center hollow cylindrical portion surrounded with play by a cup-shaped member, and wherein the cup-shaped member is configured to guide the valve slide supported by the armature.

2. The electromagnetic drive unit according to claim 1, wherein at least one of the metal cover, a spring plate supporting the spring and the cup-shaped member is of a thin, non-magnetizable sheet metal.

3. The electromagnetic drive unit according to claim 2, wherein at least one of the metal cover, the spring plate and the cup-shaped member are deep-drawn components.

4. The electromagnetic drive unit according to claim 3, wherein at least one of the metal cover, the spring plate and the cup-shaped member is of a sheet metal of non-magnetizable material having a maximum thickness of 1.2 mm.

5. The electromagnetic drive unit according to claim 4, wherein the non-magnetizable material is non-magnetic high-grade steel.

6. The electromagnetic drive unit according to claim 4, wherein the armature has at a lower end thereof located opposite a magnet gap an inwardly facing flange, wherein the valve slide has inwardly facing ribs with lower ends, the lower ends of the ribs having outwardly cantilevering projections, and wherein the projections are pretensioned by the compression spring against the inwardly directed flange.

7. The electromagnetic drive unit according to claim 6, wherein the spring plate supporting a free end of the compression spring has a rim engaging over and supported by a pole surface of a magnetic yoke.

* * * * *